United States Patent
Pham (10) Patent No.: US 11,081,001 B1
(45) Date of Patent: Aug. 3, 2021

(54) METHODS AND SYSTEMS FOR CAPTURING AND TRANSMITTING ENVIRONMENTAL AND TRAFFIC CONDITIONS DATA USING A TRAFFIC CONE

(71) Applicant: TOYOTA MOTOR ENGINEERING & MANUFACTURING NORTH AMERICA, INC., Plano, TX (US)

(72) Inventor: Alex T. Pham, San Jose, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/996,377

(22) Filed: Aug. 18, 2020

(51) Int. Cl.
*G05D 1/02* (2020.01)
*G08G 1/0967* (2006.01)
*G08G 1/01* (2006.01)
*H04W 4/44* (2018.01)
*G08G 1/017* (2006.01)

(52) U.S. Cl.
CPC ..... *G08G 1/096783* (2013.01); *G08G 1/0116* (2013.01); *G08G 1/0141* (2013.01); *G08G 1/0175* (2013.01); *H04W 4/44* (2018.02)

(58) Field of Classification Search
None
See application file for complete search history.

(56) References Cited

U.S. PATENT DOCUMENTS

| | | | | |
|---|---|---|---|---|
| 2008/0125970 A1* | 5/2008 | Scheckler | ............... | E01F 9/688 701/469 |
| 2010/0302373 A1* | 12/2010 | Monsive, Jr. | ........ | G08B 15/001 348/151 |
| 2012/0098657 A1 | 4/2012 | Bogatine | | |
| 2013/0214924 A1* | 8/2013 | Ko | ....................... | H05B 47/105 340/522 |
| 2013/0261844 A1 | 10/2013 | Ko | | |
| 2018/0310242 A1* | 10/2018 | Konishi | ........... | G08G 1/096716 |
| 2018/0335781 A1* | 11/2018 | Chase | .............. | G08G 1/096758 |

FOREIGN PATENT DOCUMENTS

| | | |
|---|---|---|
| DE | 202014004569 U1 | 8/2014 |
| EP | 2522621 A1 | 11/2012 |
| WO | 2003021044 A1 | 3/2003 |
| WO | 2008066728 A1 | 6/2008 |

OTHER PUBLICATIONS

René Schönrock, et al.; "Smart Traffic Cone-Dynamic Detection and Localization of Traffic Disruptions"; Conference Paper—Institut für Automation und Kommunikation e.V.; Sep. 2015; 9 pgs.

* cited by examiner

*Primary Examiner* — Brent Swarthout
(74) *Attorney, Agent, or Firm* — Dinsmore & Shohl LLP (57) ABSTRACT

A system for capturing and transmitting data related to traffic and environmental conditions is provided. The system includes a processor that identifies location information of the traffic cone in real time, an image sensor that captures one or more images of an area external to the traffic cone, a communication module that transmits, in real time, the location information and the one or more images as a broadcast signal, and memory utilized to store the location information and the one or more images.

20 Claims, 5 Drawing Sheets

METHODS AND SYSTEMS FOR CAPTURING AND TRANSMITTING ENVIRONMENTAL AND TRAFFIC CONDITIONS DATA USING A TRAFFIC CONE

TECHNICAL FIELD

The present specification relates to systems and methods for capturing and transmitting environmental and traffic conditions data using a traffic cone device, and more specifically, to systems and methods for capturing environmental and traffic conditions data using one or more sensors of a traffic cone, and transmitting this data, via a wireless network, to one or more external devices, e.g., local or cloud servers, vehicles, or other traffic cones.

BACKGROUND

Traffic cones are generally utilized as incident markers on roadways. These cones are generally made of bright and noticeable colors and placed at various locations on highways, streets, and alleyways to indicate, e.g., accidents, road construction and maintenance activities, potholes, traffic delays, and the like. Drivers and passengers that view these cones from a distance are only generally aware of an incident on the highway, and often need to drive past the cones to learn more details about the incident. Additionally, drivers and passengers that are not able to see the traffic cones are entirely unaware of any incidents on the roadways. Accordingly, systems and methods for configuring traffic cones with the functionality to capture data relating to traffic conditions, environmental conditions within an area of the traffic cone, and so forth, and communicate this data to various external devices and systems is contemplated.

SUMMARY

In one embodiment, a traffic cone with a plurality of components is provided. The traffic cone includes a processor that identifies location information of the traffic cone in real time, an image sensor that captures one or more images of an area external to the traffic cone, a communication module that transmits, in real time, the location information and the one or more images as a broadcast signal, and memory that is utilized to store the location information and the one or more images.

In another embodiment, a method of capturing location data, environmental data, and traffic conditions data and transmitting this data is provided. The method includes identifying, by a processor of a traffic cone, location information of the traffic cone in real time, capturing, using an imaging sensor of the traffic cone, one or more images of an area external to the traffic cone, and transmitting, using a communication module of the traffic cone, the location information and the one or more images as a broadcast signal to a vehicle.

In yet another embodiment, a system for capturing location data, environment data, and traffic conditions data and transmitting this data is provided. The system comprises a traffic cone including a processor that identifies location information of the traffic cone in real time, an image sensor that captures one or more images of an area external to the traffic cone, a communication module that transmits, in real time, the location information and the one or more images as a broadcast signal, and memory utilized to store information and the one or more images. The system also comprises a vehicle including a data communication module that receives, in real time, the broadcast signal including the location information and the real time video stream, and a vehicle processor that accesses the location information and the real time video stream included in the broadcast signal.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Conventionally, traffic cones have limited utility. For example, most traffic cones serve as markers on a street that warn drivers of the existence of, e.g., accidents, construction activities, potholes, and the like within a predetermined distance of the cone. Conventionally, these traffic cones do not, however, have the functionality to capture data such as location data (e.g., using GPS), environmental data, data relating to traffic conditions, and communicate this data, in real time, to various external devices.

Referring generally to FIGS. 1, 3, 5, and 6, embodiments of the present disclosure are directed to systems including traffic cones that have the functionality for capturing environmental data and traffic conditions data in an area external to these traffic cones and a method including various steps that, when implemented, enable one or more traffic cones to capture environmental and traffic conditions data and communicate this data, in real time, to various external devices. The system 100, depicted in FIG. 1, includes a traffic cone 102 and a plurality of vehicles 104, 106, 108, 110, 112, 114, 116, 118, and 120. The traffic cone 102 identifies location information of the traffic cone 102 in real time using, e.g., GPS. Additionally, the traffic cone captures one or more images in an area external to the traffic cone, communicates the location information and the captured one or more images in the form of a broadcast signal to one or more external devices, and stores the location information and the one or more images.

Figure 3:
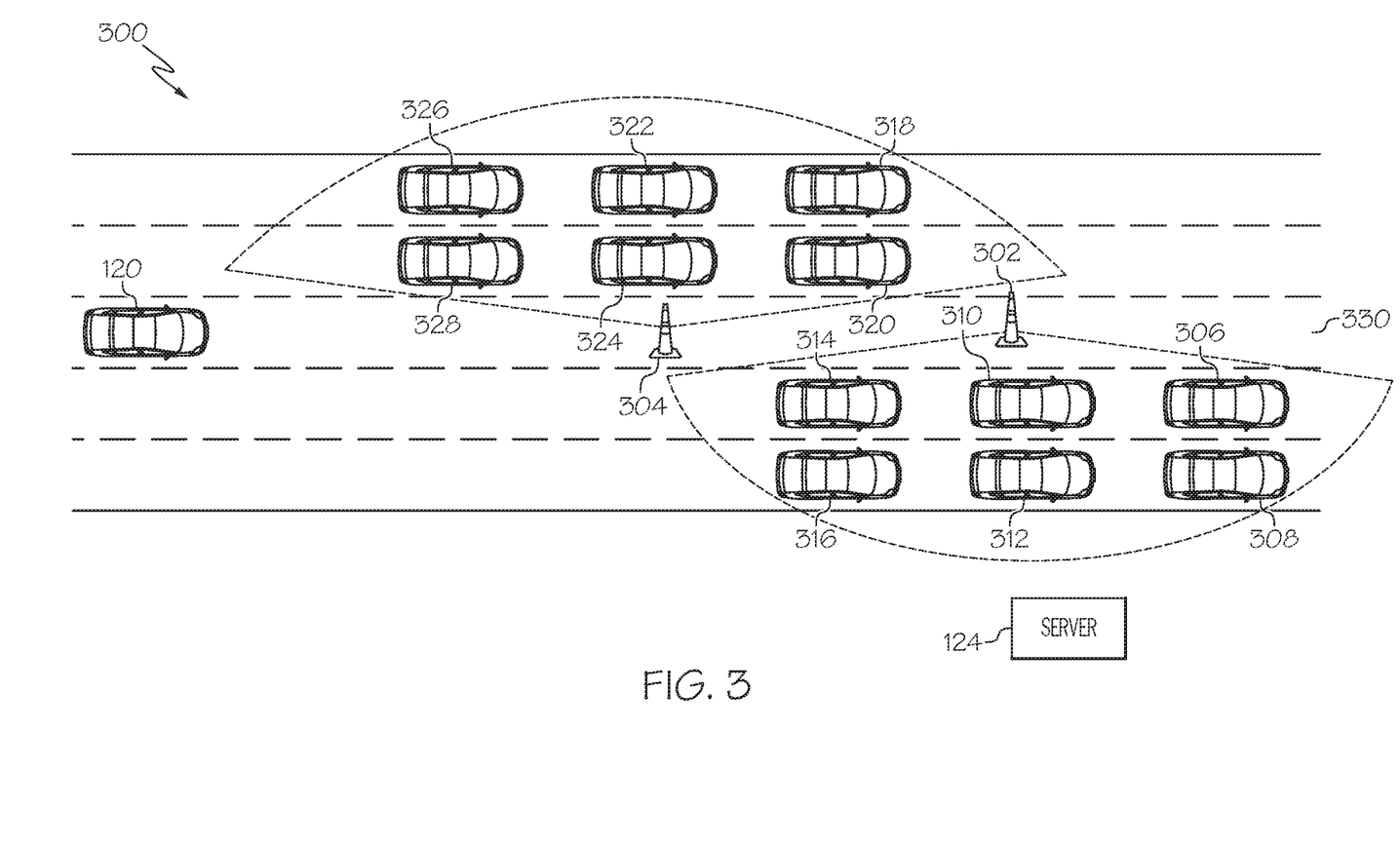
FIG. 3 schematically depicts multiple traffic cones located on different positions on a roadway, each of which is configured to capture environmental and/or traffic conditions data, and communicate this data in the form of broadcast signal to one or more vehicles or a server via a wireless network, according to one or more embodiments shown herein.
Figure 5:
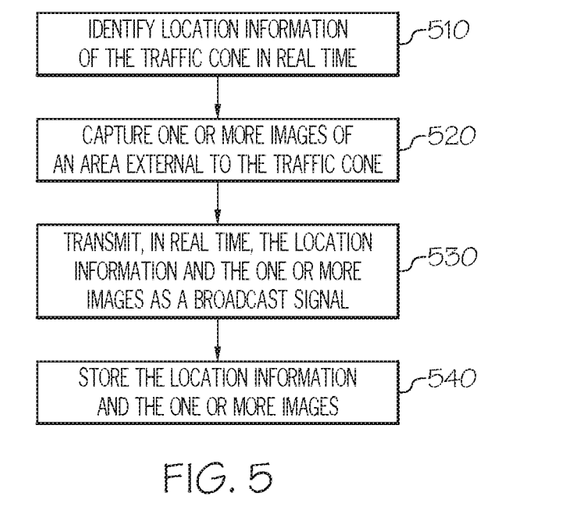
FIG. 5 schematically depicts a flowchart of a traffic cone that is configured to capture environmental and/or traffic conditions data and communicate this data as a broadcast signal to one or more vehicles in real time.
Figure 6:
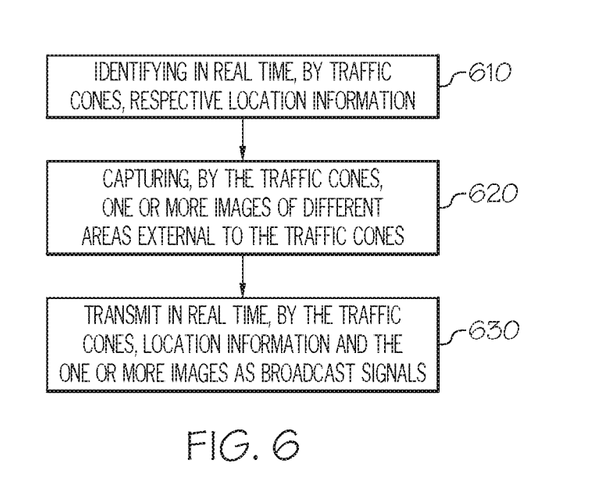
FIG. 6 schematically depicts a flowchart of multiple traffic cones within a traffic cone system that are configured to capture environmental and/or traffic conditions data and communicate this data as broadcast signals to other traffic cones and/or one or more vehicles.

The system 300, depicted in FIG. 3, includes traffic cones 302 and 304, and a plurality of vehicles 306, 308, 310, 312, 314, 316, 318, 320, 322, 324, 326, and 328. The traffic cones 302 and 304 each identify their respective location information and capture one or more images of an area external to these traffic cones. Additionally, these traffic cones communicate the location information and the captured one or more images in the form of a broadcast signal to one or more external devices (e.g., other cones, vehicles, and/or servers). FIGS. 5 and 6 detail various method steps that, when performed, result in one or more traffic cones identifying location information, capturing environmental and traffic conditions data, and communicating this information and data to one or more external devices in real time via a wireless network. In this way, the system described herein provides real time traffic and environmental data to vehicle drivers such that drivers are warned of and are better able to anticipate issues on the roadways, adjust travel plans, and so forth.

It is noted that reference will be made interchangeably between FIGS. 1-6 while describing the methods and systems of the traffic cones having the components and functionalities described herein.

Figure 1:
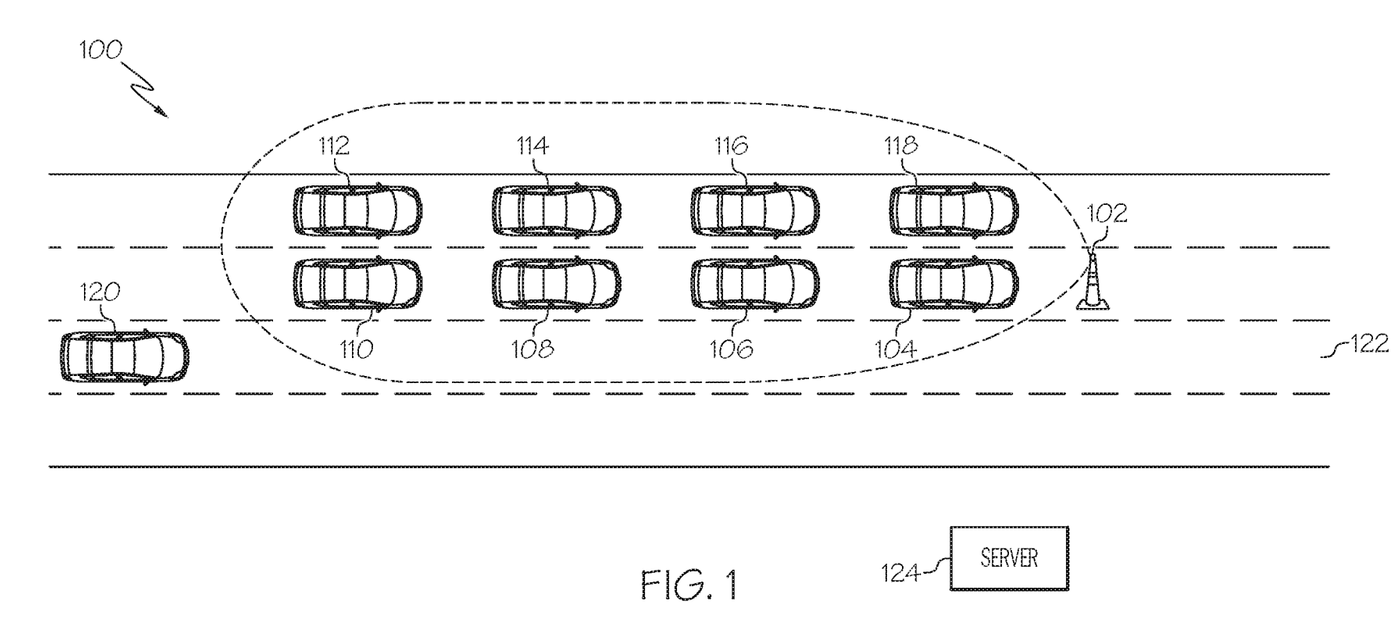
FIG. 1 schematically depicts an operation of a traffic cone located on a roadway, which is configured to capture environmental and/or traffic conditions data, and communicate this data in the form of a broadcast signal to one or more vehicles or a server via a wireless network, according to one or more embodiments shown herein.

FIG. 1 schematically depicts an operation of a traffic cone located on a roadway, which is configured to capture environmental and/or traffic conditions data, and communicate this data in the form of a broadcast signal to one or more vehicles or a server via a wireless network, according to one or more embodiments shown herein;

As stated above, in an exemplary traffic cone system 100 includes the traffic cone 102, a plurality of vehicles 104, 106, 108, 110, 112, 114, 116, 118, and 120, a representative lane 122, and a cloud server 124. In the embodiment depicted in FIG. 1, traffic cone 102 is located in a corner of lane 122 of the roadway and may be used to indicate to vehicle drivers that, e.g., road construction activities may be ongoing or begin soon on the lane. The traffic cone 102 may be communicatively coupled to the cloud server 124 and to one or more of the plurality of vehicles 104, 106, 108, 110, 112, 114, 116, 118, and 120. In embodiments, one or more of the plurality of vehicles may be communicatively coupled with the cloud server 124.

In embodiments, the traffic cone 102 may use one or more sensors to capture one or more images of an area external to the traffic cone 102 and communicate this information as a broadcast signal to one or more of the plurality of vehicles and/or the cloud server 124. The communication may occur over a wireless network 126 and be based on a communication protocol, e.g., dedicated short-range communications (DSRC), vehicle-to-everything, and the like. In embodiments, the traffic cone 102 may have the shape and dimensions of a regular traffic cone. For example, the traffic cone 102 may have a height of anywhere between 2-4 feet, have a circular or square base, and largely triangular shape extending from the base of the cone to a tip that is located at a vertical distance a certain distance away from the base. In embodiments, the cone may be coated with a bright colored paint or be made of bright colored material.

In some embodiments, one or more of the plurality of vehicles 104, 106, 108, 110, 112, 114, 116, 118, and 120 may be a vehicle including an automobile or any other passenger or non-passenger vehicle such as, for example, a terrestrial, aquatic, and/or airborne vehicle. In some embodiments, one or more of the plurality of vehicles is an autonomous vehicle that navigates its environment with limited human input or without human input. In another embodiment, the vehicle may be an unmanned aerial vehicle (UAV), commonly known as a drone. Other types of vehicles are also contemplated.

FIG. 1 depicts the system 100, which includes vehicles 104, 106, 108, 110, 112, 114, 116, 118, and 120 located on a four lane roadway. As depicted, vehicles 104, 106, 108, 110, 112, 114, 116, and 118 are shown as being driven or being stationary (e.g., during a traffic jam) on the two left-most lanes on the roadway. Additionally, the vehicle 120 is shown to be travelling on right most lane on the roadway and representative of a vehicle that is travelling a distance away such that this driver and passengers within vehicle 120 are not capable of viewing the vehicles 104, 106, 108, 110, 112, 114, 116, and 118 involved in a traffic jam (e.g., traffic conditions).

Figure 2:
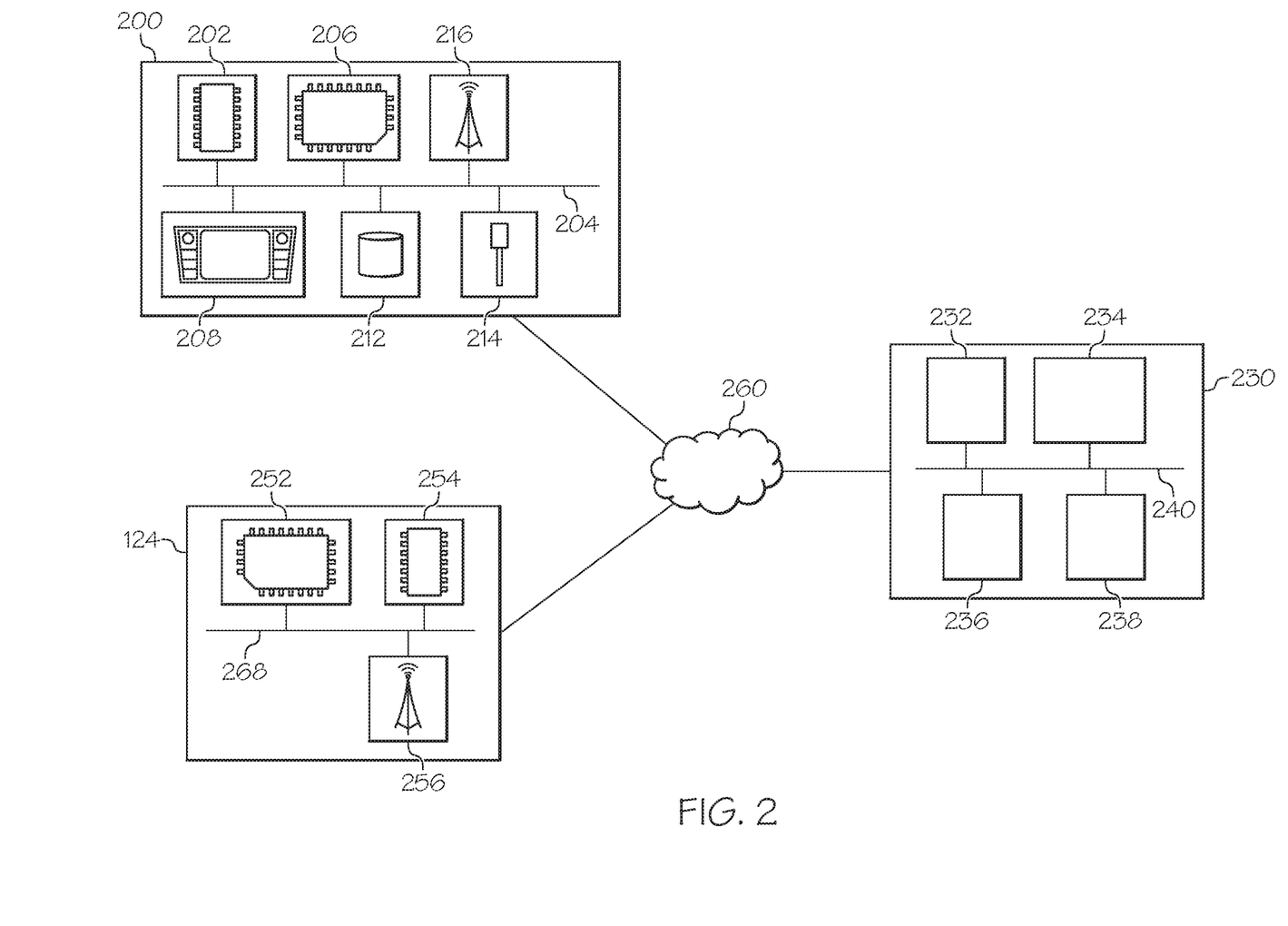
FIG. 2 schematically depicts non-limiting exemplary components in a traffic cone, a vehicle, and server, all of whom may be communicatively coupled with each other via a wireless network, according to one or more embodiments herein.

FIG. 2 schematically depicts non-limiting exemplary components of a traffic cone, an exemplary vehicle system, and a cloud server within an exemplary traffic cone system, according to one or more embodiments herein.

Notably, while the vehicle system 200 is depicted in isolation in FIG. 2, the vehicle system 200 may be included within a vehicle in some embodiments. For example, the vehicle system 200 may be included within each of the plurality of vehicles 104, 106, 108, 110, 112, 114, 116, 118, and 120. In embodiments in which the vehicle system 200 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input.

The vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Referring to FIG. 2, the vehicle system 200 comprises a satellite antenna 214 coupled to the communication path 204 such that the communication path 204 communicatively couples the satellite antenna 214 to other modules of the vehicle system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

Referring still to FIG. 2, the vehicle system 200 comprises a screen 208 for providing visual output such as, for example, maps, navigation, entertainment, or a combination thereof. The screen 208 may output one of map, navigation, and entertainment. The screen 208 is coupled to the communication path 204. Accordingly, the communication path 204 communicatively couples the screen 208 to other modules of the vehicle system 200 including, without limitation, the one or more processors 202 and/or the one or more memory modules 206. In embodiments, the screen 208 may display the data related to environmental conditions and traffic conditions that are received from one or more external devices, e.g., traffic cones and/or vehicles.

Referring still to FIG. 2, the vehicle system 200 comprises one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring motion and changes in motion of the vehicle. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

Still referring to FIG. 2, the vehicle system 200 comprises network interface hardware 216 (e.g., a data communication module) for communicatively coupling the vehicle system 200 to various external devices, e.g., the traffic cone 102 and/or one or more of vehicles 104, 106, 108, 110, 112, 114, 116, 118, and 120. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, the network interface hardware 216 (e.g., a data communication module) may receive data related to environmental and traffic conditions from various external devices, e.g., traffic cone and/or other vehicles. In embodiments, the network interface hardware 216 may utilize or be compatible with a communication protocol that is based on dedicated short range communications (DSRC). In other embodiments, the network interface hardware 216 may utilize or be compatible with a communication protocol that is based on vehicle-to-everything (V2X). Compatibility with other communication protocols is also contemplated.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. In some embodiments, the one or more memory modules 206 may store data related to various environmental and traffic conditions, location information of various external device (e.g., other vehicle and/or traffic cones), and so forth.

The one or more memory modules 206 may store vehicle identification data such as, for example, the vehicle identification number ("VIN"), serial number, a make, model, class, or style of the vehicle, a year model, or other identifying information about the vehicle. Additionally, as stated above, the one or more memory modules may store data related to various environmental and traffic conditions. Data relating to traffic conditions may pertain to data of traffic jams, accidents, road construction and maintenance activities, and so forth. Data relating to environmental conditions could include, e.g., data related to floods, snow storms, thunder storms, and other such natural disasters. In embodiments, the one or more memory modules 206 may store data related to environmental conditions and/or traffic conditions that are received from various external devices, e.g., traffic cones, other vehicles, and so forth.

The traffic cone system 230 includes a processor 232, a communication module 234, an image sensor 236, and one or more memory modules 238. The processor 232 may be a controller, an integrated circuit, a microchip, a computer, or any other computing device. The processor 232 may be coupled to a communication path 240 that provides signal interconnectivity between various components of the traffic cone system 230. The communication module 234 may be a transceiver that is implemented as part of a network hardware interface having the functionality to communicate with various external devices via wireless network 222.

Additionally, the communication module 234 may be coupled to the communication path 240 that provides signal interconnectivity between various components of the traffic cone system 230. In embodiments, the transceiver may utilize or be compatible with a communication protocol that is based on vehicle-to-everything (V2X). In other embodiments, the transceiver may utilize or be compatible with a communication protocol that is based on dedicated short range communications (DSRC). Compatibility with other communication protocols is also contemplated. The data relating to environmental conditions and/or traffic conditions may transmitted by the communication module 234, via the wireless network 260, to one or more external devices, e.g., one or more vehicles and/or traffic cones.

The image sensor 236 may be a camera. The image sensor 236 may be coupled to a communication path 240 that provides signal interconnectivity between various components of the traffic cone system 230. The camera may be any device having an array of sensing devices capable of detecting radiation in an ultraviolet wavelength band, a visible light wavelength band, or an infrared wavelength band. The camera may have any resolution. In some embodiments, one or more optical components, such as a mirror, fish-eye lens, or any other type of lens may be optically coupled to the camera. In embodiments, the camera may have a broad angle feature that enables capturing digital content within a 150 degree to 180 degree arc range. Alternatively, the camera may have a narrow angle feature that enables capturing digital content within a narrow arc range, e.g., 60 degree to 90 degree arc range. In embodiments, the one or more cameras may be capable of capturing high definition images in a 720 pixel resolution, a 1080 pixel resolution, and so forth. Alternatively or additionally, the camera may have the functionality to capture a continuous real time video stream for a predetermined time period.

In embodiments, the camera may capture data related to environmental conditions and traffic conditions within a certain distance of the traffic cone. For example, the camera may capture one or more images of a cluster of vehicles in a traffic jam in an area external to the traffic cone. Additionally, the camera may capture one or more images of a portion of the roadway flooding due to a thunderstorm, snowstorm, and the like, in an area external to the traffic cone.

The one or more memory modules 238 may comprise RAM, ROM, flash memories, hard drives, or any device capable of storing machine readable and executable instructions such that the machine readable and executable instructions can be accessed by the one or more processors. The one or more memory modules 238 may be coupled to a communication path 240 that provides signal interconnectivity between various components of the traffic cone system 230. The one or more memory modules 238 store the data captured by the image sensor 236 such as the environmental and traffic conditions data described above.

The cloud server 124 includes one or more processors 252, one or more memory modules 254, network interface hardware 256, and a communication path 258. The one or more processors 252 may be a controller, an integrated circuit, a microchip, a computer, or any other computing device. The one or more memory modules 254 may comprise RAM, ROM, flash memories, hard drives, or any device capable of storing machine readable and executable instructions such that the machine readable and executable instructions can be accessed by the one or more processors 252. The network interface hardware 256 communicates with various external device, e.g., one or more traffic cones vehicles. All of the components within the cloud server 124 may be coupled to a communication path 258.

FIG. 3 depicts schematically depicts multiple traffic cones located on different positions on a roadway, each of which is configured to capture environmental and/or traffic conditions data, and communicate this data in the form of a broadcast signal to one or more vehicles or the server via a wireless network.

As stated above, an exemplary traffic cone system 300 includes a first traffic cone 302 and a second traffic cone 304, a plurality of vehicles 306, 308, 310, 312, 314, 316, 318, 320, 322, 324, 326, 328, and 120, a representative middle lane 330, and the cloud server 124. In the embodiment depicted in FIG. 3, the first traffic cone 302 is located in a corner of representative middle lane 330 of the roadway and may be used to indicate to vehicle drivers that, e.g., road maintenance, potholes, road construction activities, and so forth, may be occurring within a predefined time frame. The traffic cones 302 and 304 may be communicatively coupled to the cloud server 124 and to one or more of the plurality of vehicles 306, 308, 310, 312, 314, 316, and 318, 320, 322, 324, 326, 328, and 120. In embodiments, one or more of the plurality of vehicles may be communicatively coupled with the cloud server 124.

The traffic cones 302 and 304 may have the dimensions and functionalities similar the traffic cone 102 depicted in FIG. 1. In embodiments, each of the traffic cones 302 and 304 may have the shape and dimensions of a regular traffic cone, e.g., a height in the range of 2-4 feet, a circular or square base, and largely triangular shape extending from the base of the cone to the tip. In embodiments, the cone may be coated with a bright colored paint or be made of bright colored material. Other variations and configurations are also contemplated.

In embodiments, the first and second traffic cones 302 and 304 may each be embedded or installed with one or more sensors that capture one or more images of areas that are external to first traffic cone 302 and the second traffic cone 304. As depicted in FIG. 3, these areas are different and marked by dashed lines. The captured images may be communicated as broadcast signals, via wireless network 260, to one or more of the plurality of vehicles and/or the cloud server 124. The communication may occur over a wireless network 126 and be based on a communication protocol, e.g., dedicated short-range communications (DSRC), vehicle-to-everything, and the like.

In some embodiments, one or more of the plurality of vehicles 306, 308, 310, 312, 314, 316, 318, 320, 322, 324, 326, 328, and 120 may be a vehicle including an automobile or any other passenger or non-passenger vehicle such as, for example, a terrestrial, aquatic, and/or airborne vehicle. In some embodiments, one or more of the plurality of vehicles is an autonomous vehicle that navigates its environment with limited human input or without human input. In another embodiment, the vehicle may be an unmanned aerial vehicle (UAV), commonly known as a drone. Other types of vehicles are also contemplated.

Additionally, the exemplary traffic cone system 300 depicts vehicles 306, 308, 310, 312, 314, 316, 318, 320, 322, 324, 326, 328, and 120 located on a five lane roadway. As depicted, vehicles 306, 308, 310, 312, 314, 316, and 318, and vehicles 320, 322, 324, 326, and 328 are shown as being driven or being stationary (e.g., during a traffic jam) on the two left-most lanes and the two right-most lanes on the roadway. Additionally, the vehicle 120 is shown to be travelling on the representative middle lane 330 and is representative of a vehicle that is travelling a distance away from such that the driver and passengers within the vehicle 120 are not capable of viewing the vehicles 306, 308, 310, 312, 314, 316, 318, 320, 322, 324, 326, and 328 involved in a traffic jam (e.g. traffic conditions).

Figure 4:
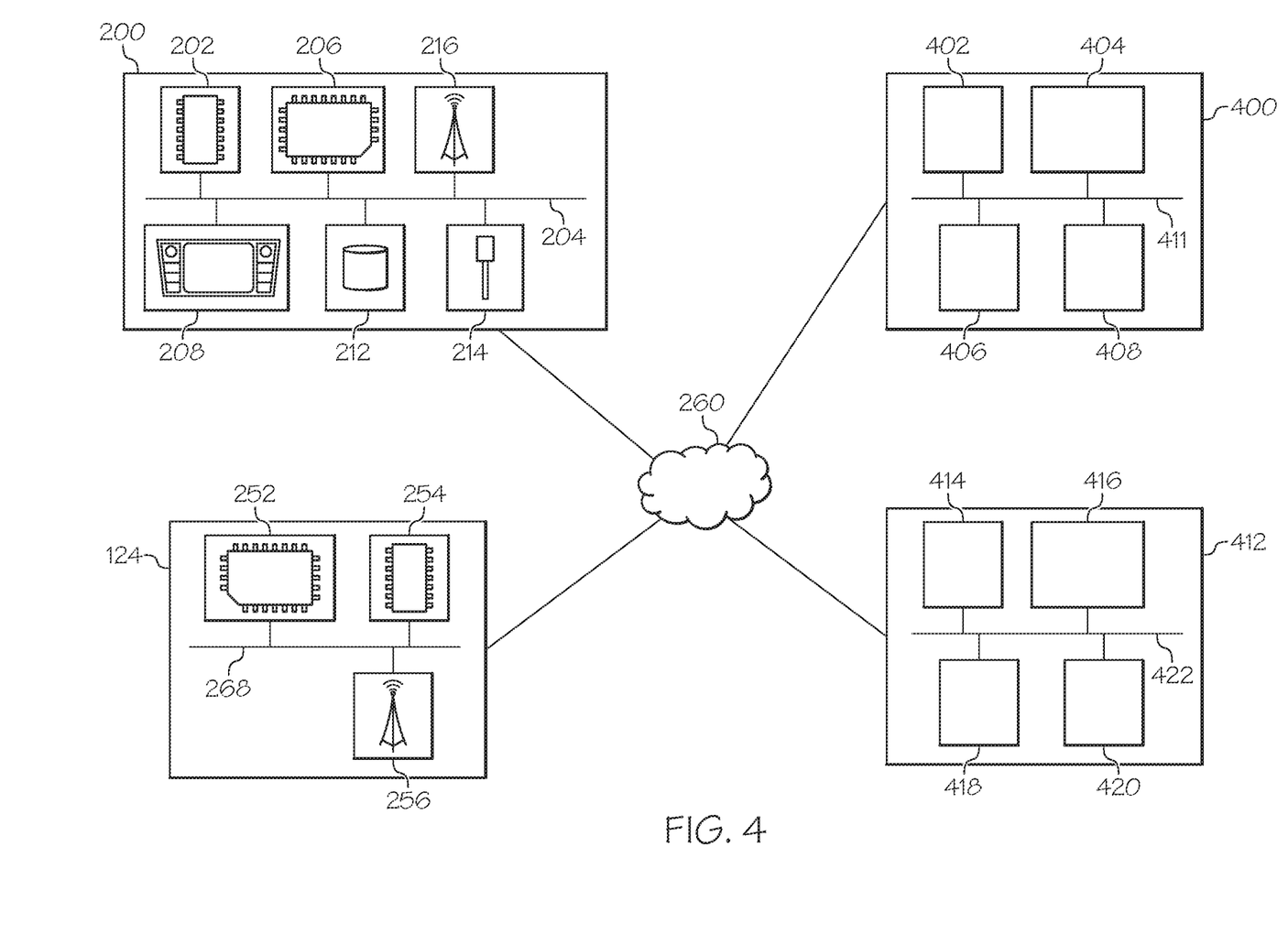
FIG. 4 schematically depicts non-limiting exemplary components in multiple traffic cones, a vehicle, and server, all of whom may be communicatively coupled with each other via a wireless network, according to one or more embodiments herein.

FIG. 4 schematically depicts non-limiting exemplary components of multiple traffic cone, an exemplary vehicle system, and a cloud server within an exemplary traffic cone system, according to one or more embodiments herein.

It is noted that the vehicle system 200 depicted in FIG. 4 is identical to the vehicle system 200 depicted in FIG. 2. As such, the components and functionalities of the components of the vehicle system 200 depicted in FIG. 4 are identical to the components and functionalities of the vehicle system 200 depicted in FIG. 2. The cloud server 124 depicted in FIG. 4 is identical to the cloud server 124 depicted in FIG. 2. As such, the components and functionalities of the components of the cloud server 124 depicted in FIG. 4 are identical to the components and functionalities of the cloud server 124 depicted in FIG. 2.

The traffic cone systems 400 and 412 depicted in FIG. 4 correspond to the traffic cone system 230 depicted in FIG. 2. As such, the processors 402 and 414, each correspond to the processor 232 depicted in FIG. 2, the communication modules 404 and 416 correspond to the communication module 234, each of which correspond to the one or more memory modules 238. All of the components within the traffic cone system 400 may be coupled to each other via a communication path 410 that provides signal interconnectivity between various components. Additionally, all of the components within the traffic cone systems 412 may be coupled to each other via a communication path 422 that provides signal interconnectivity between various components. The image sensors 406 and 418 correspond to the image sensor 236 of the traffic cone system 230 depicted in FIG. 2, and the one or more memory modules 408 and 420 correspond to the one or more memory modules 238 of the traffic cone system 230 depicted in FIG. 2.

FIG. 5 depicts a flowchart of a traffic cone that is configured to capture environmental and/or traffic conditions data and communicate this data as a broadcast signal to one or more vehicles in real time. In step 510, the traffic cone 102 in the traffic cone system 100 identifies location information of the traffic cone in real time. Referring to FIG. 1, the traffic cone 102 is shown to be located in a corner of lane 122 of the roadway and servers as a roadway marker that warns drivers of, e.g., potholes, road construction activities may be ongoing or beginning soon, and so forth. The traffic cone 102 identifies, using the built in processor 232 shown in FIG. 2, precise geographic coordinates using, e.g., GPS. In embodiments, the location information of the traffic cone 102 can be identified with a high degree of precision such that the traffic cone's location can be identified at or within a few feet of the cone's actual location on the roadway. While location identification using GPS is contemplated, other location identification mechanisms may also be used.

In step 520, the traffic cone 102 of the traffic control system 100 may capture the one or more images of an area external to the traffic cone 102. In embodiments, the traffic cone 102 may capture, using one or more sensors 236 depicted in FIG. 2, one or more images within an area external to the traffic cone (e.g., a predefined distance within a certain radius of the traffic cone). The one or more captured images may include content in the form of stationary or moving objects. Referring to FIG. 1, the traffic cone 102 may be located in a corner of the lane 122 and positioned at an angle such that the one or more sensors 236 (e.g., one or more cameras capable of capturing a high definition image or a live video stream of an area) capture images of vehicles 104, 106, 108, 110, 112, 114, 116, and 118 located within a range of, e.g., 100 feet to 500 feet. In embodiments, the one or more cameras may have a broad angle feature that enables capturing digital content within a 150 degree to 180 degree arc range. Alternatively, the one or more cameras may have a narrow angle feature that enables capturing digital content within a narrow arc range, e.g., 60 degree to 90 degree arc range. In embodiments, the one or more cameras may be capable of capturing high definition images in a 720 pixel resolution, a 1080 pixel resolution, and so forth. Alternatively or additionally, the one or more cameras may have the functionality to capture a continuous real time video stream for a predetermined time period, e.g., 30 minutes, 1 hour, 5 hours, 24 hours, and the like.

The range (e.g. 100 to 500 feet), depicted with dashed lines, which encompass vehicles 104, 106, 108, 110, 112, 114, 116, and 118. Thereafter, in embodiments, the traffic cone 102 may determine with the use of processor 232 that these vehicles have appear to be part of a traffic jam, which may caused by, e.g. potholes, road construction activities, and so forth. Alternatively or additionally, the traffic cone 102 may utilize communication module 234 to communicate the captured images to a server 124, which may analyze the received images and determine the possibility or likelihood of a traffic jam within a particular area (e.g., within the area indicated by the dashed lines).

In step 530, the traffic cone 102 of the traffic cone system 102 may transmit, in real time, the one or more images and the location information of the traffic cone as a broad broadcast signal. Referring to FIG. 1, the traffic cone 102 may transmit the broadcast signal to vehicle 120, which is located at a significant distance away from the traffic cone 102, and as such, the drivers and passengers within the vehicle 120 will be able to determine that there is a traffic jam near the traffic cone 102 much before the vehicle 120 approaches or is part of the traffic jam. In embodiments, the vehicle 120 may receive the broadcast signal 1 kilometer away (approximately 0.6 miles) away from traffic cone 102.

In embodiments, the broadcast signal may include a combination of both the captured images and the location information of the traffic cone 102. Alternatively or additionally, the location information may be transmitted as a particular broadcast signal and the one or more images may be transmitted as a separate broadcast signal. In embodiments, the broadcast signals may be transmitted using a communication protocol that is based one at least one of V2X or DRSC protocols. In embodiments, broadcast signals may be communicated at particular times in the day, at predetermined intervals throughout the day, and the like. For example, the broadcast signals maybe transmitted at intervals of five minutes, ten minutes, thirty minutes, one hour, and so forth. Other time intervals are also contemplated.

In some embodiments, the traffic cone 102 of the traffic cone system 100 may transmit one or more broadcast signal if certain conditions are satisfied. For example, the traffic cone 102 may transmit one or more broadcast signals, if one or more additional sensors, as depicted in FIG. 2, detect a particular vehicle a certain distance away from the traffic cone (e.g., 500 feet or 1000 feet). For example, upon detecting the vehicle 120 within a particular range of the traffic cone 102, the traffic cone 102 may transmit a broadcast signal to the vehicle 120.

In embodiments, the vehicle 120 depicted in FIG. 1 may receive the location information of the traffic cone 102 and the one or captured images. Specifically, a data communication module 2 of the vehicle 120 may receive, in real time, the broadcast signal transmitted from the traffic cone 102 and utilize the processor 232 to access the information included in the broadcast signal. In embodiments, prior to accessing the information in the broadcast signal, the processor 232 of the vehicle 120 may implement various authentication processes. In particular, the processor 232 may authenticate the identity of the traffic cone 102 (e.g., by confirming that any identification numbers or information associated with the traffic cone 102 is correct). Upon successful authentication, the processor 232 will access the content included in the broadcast signal, namely the cone's location information and the one or more images captured by the cone. In embodiments, depending on the capability of the vehicle 120, the captured images may be output on a display of the vehicle.

In step 540, the traffic cone 102 may store the location information of the cone and the one or more images captured by one or more cameras of the cone in storage (e.g., memory) of the traffic cone 102. In embodiments, the one or more memory modules 238 as depicted in FIG. 2, may be utilized to store the one or more images of the vehicles 104, 106, 108, 110, 112, 114, 116, and 118 that form a traffic jam a certain distance away from the traffic cone 102. Alternatively or additionally, the one or more memory modules 238 may be used to store a continuous real time video stream for a predetermined time period, e.g., 30 minutes, 1 hour, 5 hours, 24 hours, and the like.

FIG. 6 schematically depicts a flow chart of multiple traffic cones within a traffic cone system 300 that are configured to capture environmental and/or traffic conditions data and communicate this data as a broadcast signal to other traffic cones and/or one or more vehicles.

In step 610, multiple traffic cones identify their respective location information in real time. Referring to FIG. 3, a first traffic cone 302 of traffic cone system 300 located at a first location on lane 330 of a roadway and a second traffic cone 304 of the traffic cone system 300 located at a second location on lane 330 of the roadway may each use respective processors 402 and 414 to determine precise geographic coordinates corresponding to their respective locations. In embodiments, the GPS may be used to identify the locations. The location information of the traffic cones 302 and 304 can be identified with a high degree of precision such that these location can be identified at or within a few feet of the actual location of the cones. While location identification using GPS is contemplated, other location identification mechanisms may also be used.

In step 620, the first and second traffic cones 302 and 304 of the traffic cone system 300 may capture the one or more images of two different areas external to these cones. In embodiments, the traffic cone 102 may capture, using one or more sensors 406 and 418 depicted in FIG. 4, one or more images within two different areas external to these traffic cones (e.g., a predefined distance within a certain radius of these traffic cones). The one or more captured images may include content in the form of stationary or moving objects.

Specifically, the first traffic cone 302 may be located at the first location on lane 330 of the roadway and situated at an angle such that the one or more sensors 406 capture images of vehicles 306, 308, 310, 312, 314, and 316 that are located within a predefined range of the first cone 302, e.g., 100 feet to 500 feet. Similarly, the second traffic cone 304 is located at the second position on lane 330 and situated at an angle such that the one or more sensors 418 capture images of vehicles 318, 320, 322, 324, 326, and 328 that are located within a predefined range of the second traffic cone 304, e.g., 100 feet to 500 feet. The ranges (e.g. 100 to 500 feet), depicted with dashed lines in FIG. 3, encompass vehicles 306, 308, 310, 312, 314, 316, 318, 320, 322, 324, 326, and 328. Thereafter, in embodiments, the traffic cones 302 and 304 may determine, using processors 402 and 414 respectively that these vehicles have appear to be part of a traffic jam caused by, e.g. potholes, road construction activities, and so forth. Alternatively or additionally, the cones may utilize communication modules 404 and 416 to communicate the captured images to a server 124, which may analyze the received images and determine the possibility or likelihood of a traffic jam within a particular area (e.g., within the areas indicated by the dashed lines).

In embodiments, the one or more sensors 406 and 418 may be one or more cameras having a narrow angle feature that enables capturing digital content within a narrow arc range, e.g., 60 degree to 90 degree arc range. Alternatively or additionally, the one or more sensors 406 and 418 may have a broad angle feature enabling capturing digital content within a broad arc range, e.g., 150 to 180 degrees. Depending on the functionalities of the one or more cameras, the predefined ranges of the first cone 302 and the second traffic cone 304 may vary. Additionally, as stated above, the one or more cameras may be capable of capturing high definition images in a 720 pixel resolution, 1080 pixel resolution, and so forth. Alternatively or additionally, the one or more cameras may have the functionality to capture a continuous real time video stream for a predetermined time period, e.g., 30 minutes, 1 hour, 5 hours, 24 hours, and the like.

In step 630, multiple traffic cones may respectively transmit, in real time, their respective location information one or more captured images and respectively transmit, in real time, these images and their location information as broadcast signals.

Referring to FIG. 3, the first traffic cone 302 may transmit images of vehicles 306, 308, 310, 312, 314, and 316 and the location of the first traffic cone 302 (e.g., identified via GPS) as part of a broadcast signal. In embodiments, the broadcast signal may either be a single signal including both the location information and the images of the vehicles. Alternatively or additionally, the images of vehicles 306, 308, 310, 312, 314, and 316 may be transmitted as part of a broadcast signal and the location information may be transmitted as part of a different broadcast signal. Similarly, the second traffic cone 304 may transmit images of 318, 320, 322, 324, 326, and 328 and location of the first traffic cone 302 (e.g., identified via GPS) as part of a particular broadcast signal. In embodiments, the broadcast signal may either be a single signal including both the location information and the images of the vehicles. Alternatively or additionally, the images of vehicles 318, 320, 322, 324, 326, and 328 may be transmitted as part of a particular broadcast signal and the location information may be transmitted as part of a different broadcast signal.

In embodiments, the broadcast signals may be transmitted by the communication modules 404 and 416 of the first and second traffic cones 302 and 304 respectively, using a communication protocol that is based one at least one of V2X or DRSC protocols. The broadcast signals may be transmitted to one or more vehicles (e.g., vehicle 120) via wireless network 260. As described above, the broadcast signals may be communicated at particular times in the day, at predetermined intervals throughout the day, and the like.

In some embodiments, the first traffic cone 302 may transmit the location information of the first traffic cone 302 and one or more images captured by the first traffic cone 302 as part of a broadcast signal to the second traffic cone 304. The second traffic cone 304 may combine the broadcast signal (and the contents therein) with a different broadcast signal, namely one that includes the location information of the second traffic cone 304 and one or more images captured by the second traffic cone. Specifically, in some embodiments, the second traffic cone 304 may combine the images included in the broadcast signal received from the first traffic cone 302 (i.e. images of vehicles 306, 308, 310, 312, 314, and 316) with one or more images captured by the second traffic cone 304 (i.e. images of vehicles 318, 320, 322, 324, 326, and 328) to generate a new image. In embodiments, the new image an all around image (e.g., representative a 360 degree view that includes the area in which vehicles 306, 308, 310, 312, 314, and 316 are present and another area in which 318, 320, 322, 324, 326, and 328 are present). In some embodiments, the second traffic cone 304 may transmit the newly generated image (e.g., all around image) to one or more vehicles (e.g., vehicle 120).

In embodiments, the vehicle 120 depicted in FIG. 3 may receive the location information of the first traffic cone 302 and one or images captured by this cone and the location information of the second traffic cone 304 and one or images captured by this cone as part of a single broadcast message or multiple broadcast messages, as described above. In embodiments, the data communication module (e.g. network interface hardware 216 depicted in the vehicle system 200) of the vehicle 120 may receive, in real time, one or more broadcast signals from the first traffic cone 302 and/or the second traffic cone 304 and utilize the processor 202 to access the information included in the broadcast signal.

In embodiments, prior to accessing the information in the broadcast signal, the one or more processors 202 of the vehicle system 200 embedded in vehicle 120 may implement various authentication processes. In particular, the one or more processors 202 may authenticate the identity of the first traffic cone 302 and the second traffic cone 304. Upon successful authentication, the processor 202 will access the content included in the received one or more broadcast signals. In embodiments, depending on the capability of the vehicle 120, the captured images may be output on a display of the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A traffic cone comprising:
an imaging sensor that captures an image of an area external to the traffic cone;
a communication module that receives, from an additional traffic cone, an additional image of an additional area external to the additional traffic cone; and
a processor that:
identifies location information of the traffic cone in real time,
combines the image of the area with the additional image of the additional area, and
instructs the communication module to transmit the combination of the image and the additional image and the location information as a broadcast signal to a vehicle.

2. The traffic cone of claim 1, wherein the communication module transmits the broadcast signal using a communication protocol based on at least one of V2X or DSRC.

3. The traffic cone of claim 1, wherein the traffic cone includes an additional sensor that detects the vehicle within a predetermined distance of the traffic cone.

4. The traffic cone of claim 3, wherein the communication module transmits the location information and the combination of the image and the additional image as the broadcast signal upon the additional sensor detecting the vehicle within the predetermined distance of the traffic cone.

5. The traffic cone of claim 1, wherein the imaging sensor includes a camera having one or more of a wide angle capability and a narrow angle capability.

6. The traffic cone of claim 1, wherein the imaging sensor is a camera configured to capture digital content in one or more of a 720 pixel resolution or a 1080 pixel resolution.

7. The traffic cone of claim 1, the image and the additional image comprise a real time video stream of the area.

8. A method comprising:
identifying, by a processor of a traffic cone, location information of the traffic cone in real time;
capturing, using an imaging sensor of the traffic cone, one or more images of an area external to the traffic cone;
receiving, from an additional traffic cone, one or more additional images of an additional area external to the additional traffic cone;
combining, the one or more images and the one or more additional images; and
transmitting, using a communication module of the traffic cone, the location information and the combination of the one or more images and the one or more additional images as a broadcast signal to a vehicle.

9. The method of claim 8, further including detecting, using an additional sensor of the traffic cone, the vehicle within a predetermined distance of the traffic cone.

10. The method of claim 9, wherein the transmitting of the location information and the combination of the one or more images and the one or more additional images as the broadcast signal occurs upon detecting the vehicle within the predetermined distance of the traffic cone.

11. The method of claim 8, wherein the imaging sensor is a camera having one or more of a wide angle capability and a narrow angle capability.

12. The method claim 8, wherein the imaging sensor is a camera configured to capture digital content in one or more of a 720 pixel resolution or a 1080 pixel resolution.

13. The method of claim 8, further comprising:
identifying, by an additional processor of the additional traffic cone, additional location information of the additional traffic cone in real time; and capturing, using an additional imaging sensor of the additional traffic cone, a different set of images of a different area within a different predetermined distance of the additional traffic cone.

14. The method of claim 13, further comprising transmitting, using an additional communication module of the additional traffic cone, the additional location information and the different set of images of the different area as a different broadcast signal to the vehicle.

15. The method of claim 14, further comprising:
receiving, by the vehicle, the additional location information and the different set of images of the different area;
authenticating, by the vehicle, a different identity of the additional traffic cone; and
accessing, by the vehicle, the additional location information and the different set of images of the different area upon authentication of the different identity of the additional traffic cone.

16. The method of claim 8, further comprising:
generating, based on the combination, an all around image, the all around image being based on a 360 degree view that includes the area and the additional area; and
transmitting, by the traffic cone, the all around image to the vehicle.

17. The method of claim 8, wherein the one or more images of the area includes one or more objects external to the traffic cone.

18. The method of claim 17, wherein the one or more objects include at least one of a moving object or a stationary object.

19. A system comprising:
a traffic cone including:
an imaging sensor that captures an image of an area external to the traffic cone;
a communication module that receives, from an additional traffic cone, an additional image of an additional area;
a processor that:
identifies location information of the traffic cone in real time,
combines the image of the area external to the traffic cone and the additional image of the additional area, and
instructs the communication module to transmit the combination of the image and the additional image and the location information of the traffic cone to a vehicle as a broadcast signal; and
memory utilized to store the location information and the image and the additional image; and
the vehicle including:
a data communication module that receives, in real time, the broadcast signal including the location information and the combination of the image and the additional image; and
a vehicle processor that accesses the location information and the combination of the image and the additional image included in the broadcast signal.

20. The system of claim 19, wherein the communication module transmits the broadcast signal using a communication protocol based on at least one of V2X or DSRC.

* * * * *

UNITED STATES PATENT AND TRADEMARK OFFICE
CERTIFICATE OF CORRECTION

PATENT NO. : 11,081,001 B1  
APPLICATION NO. : 16/996377  
DATED : August 3, 2021  
INVENTOR(S) : Pham Page 1 of 1

It is certified that error appears in the above-identified patent and that said Letters Patent is hereby corrected as shown below:

In the Claims

In Column 14, Line(s) 61, Claim 12, after "method", insert --of--.

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*